Dec. 13, 1960 K. J. SYLVEST 2,963,907
PNEUMATIC WEIGHING APPARATUS
Original Filed Feb. 24, 1954

INVENTOR
Karl Deus Sylvest
BY
Pennie Edmonds Morton Barrows Taylor
ATTORNEYS

United States Patent Office 2,963,907
Patented Dec. 13, 1960

2,963,907

PNEUMATIC WEIGHING APPARATUS

Karl Jens Sylvest, Copenhagen, Denmark, assignor, by mesne assignments, to F. L. Smidth & Co., New York, N.Y., a corporation of Delaware Application Aug. 23, 1956, Ser. No. 605,770, which is a division of application Ser. No. 412,345, Feb. 24, 1954. Divided and this application Nov. 8, 1957, Ser. No. 695,327

1 Claim. (Cl. 73—229)

This invention relates to systems for conveying finely divided material and is concerned with a novel conveying system, in which pneumatic channels are employed and which includes means for continuously recording the total weight of the material passing through the system in a selected time interval. This application is a division of my copending application Serial No. 605,770, filed August 23, 1956, now abandoned, which is a division of application Serial No. 412,345, filed February 24, 1954 and now Patent 2,774,637, issued December 18, 1956.

In the system of the present application, the material travels through aligned pneumatic channels from the point of supply to the point of delivery. The term "pneumatic channel," as used herein, refers to a trough mounted at an inclination and provided with means for aerating the material traveling through it. Ordinarily, such a channel contains a partition lying spaced above and parallel to its bottom, the partition being formed of material porous to air, but impervious to the material being conveyed. Air under pressure is admitted to the channel to enter the material on the partition and render the material fluent and the fluent material forms a layer flowing along the surface of the partition under gravity and like a liquid to the lower end of the channel.

The system of the invention includes an integrating meter, which may be of any of the standard mechanical or electrical types and has a counting mechanism operated at a rate proportional at all times to the product of the instantaneous weight of the material in a selected pneumatic channel forming part of the system and of the instantaneous velocity of the material traveling through the channel. For this purpose, the counting mechanism is provided with drive means and co-operating means for actuating the drive means. One of the co-operating means is responsive to variations in the weight of the material and actuates the drive means in response to the instantaneous weight of the material in the selected channel, while the other of the co-operating means is operated by the material traveling through the channel and actuates the drive means at a rate corresponding to the instantaneous velocity of the material.

In the apparatus of the invention, the weight-responsive means functions in accordance with variations in the difference in pressure of air before and after it has passed through the layer of material traveling through a selected channel. The differences in pressure result from differences in density of the layer of the material and are thus proportional to differences in the instantaneous weight of the material. The means, which actuates the counter drive means at a rate corresponding to the velocity of the flowing material, includes an endless series of vanes mounted on a belt or a wheel and the vanes enter the material traveling through the selected channel and are moved by the material at a rate depending on the velocity of the latter.

For a better understanding of the invention, reference may be made to the accompanying drawing, in which.

Figure 1:
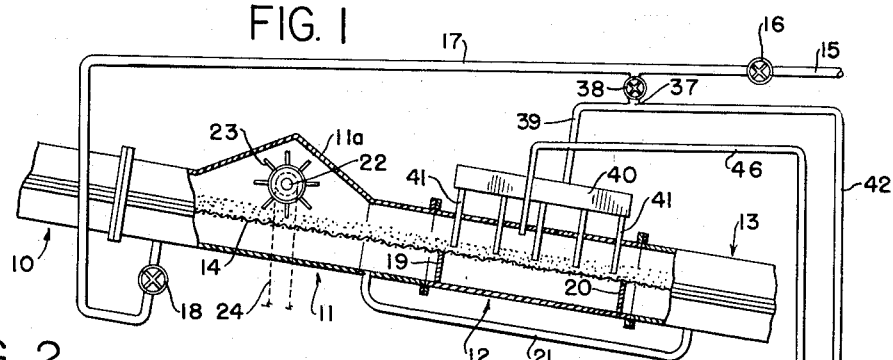
Fig. 1 is a diagrammatic view, partly in elevation with parts broken away and partly in perspective, showing one form of the apparatus of the invention.
Figure 2:
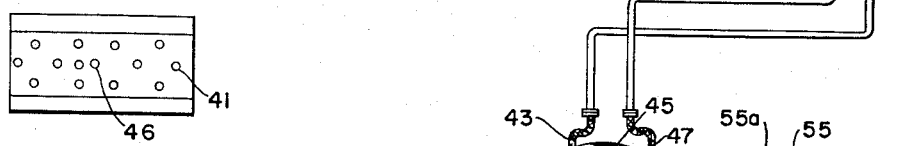
Fig. 2 is a bottom plan view of means for introducing air into the layer of material traveling through the system.
Figure 3:
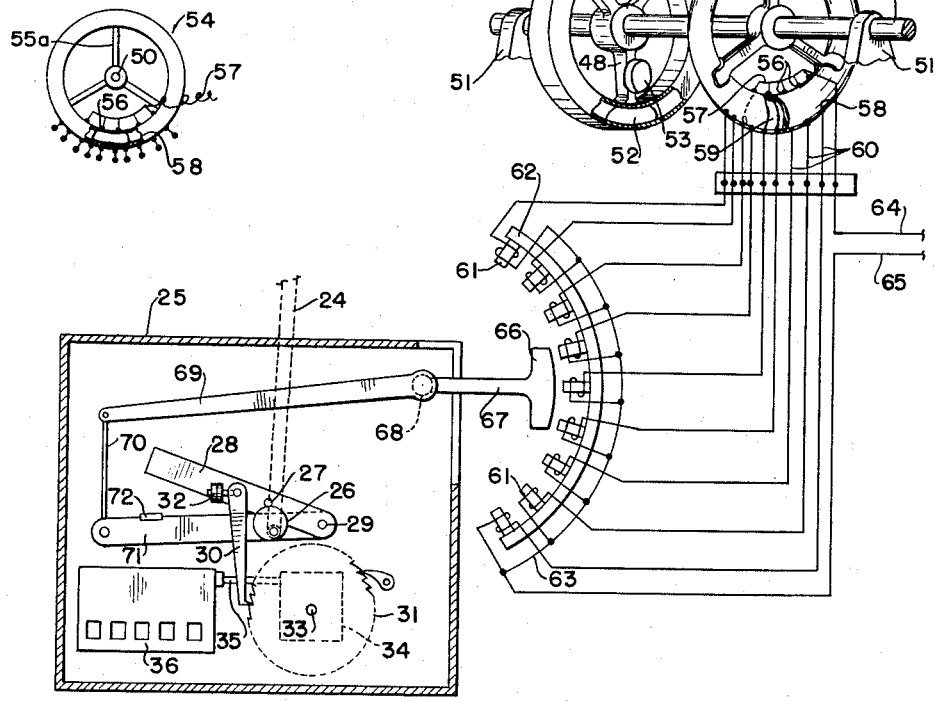
Fig. 3 is a front elevational view of a switch employed in the system.

The form of the system illustrated in Fig. 1 comprises a number of pneumatic channels 10, 11, 12, and 13, each consisting of a bottom trough and a top connected together by lateral flanges, adjacent channels being connected end to end by end flanges. Each channel contains a porous diaphragm, such as diaphragm 14 in channel 11, and air is supplied beneath the diaphragms in channels 10 and 11 from a main air supply line 15 containing a valve 16 and having a branch 17 with a valve 18 leading to the bottom of channel 11. The space in channel 12 beneath the diaphragm is closed at opposite ends by solid plates 19, 20 and air is supplied to the bottom of channel 13 by an air pipe leading from the bottom of channel 11 beneath channel 12 to the bottom of channel 13.

The cover of channel 11 is enlarged at 11a to provide space for a vane wheel 22, which has vanes 23 extending into the layer of material traveling along the diaphragm 14. The shaft of wheel 22 is connected by a chain indicated at 24 to the shaft of an integrating meter enclosed in a casing 25. The shaft carries an eccentric 26, which acts on a pin 27 on an arm 28 pivoted on a fixed pivot 29 within the casing. The arm carries a pawl 30 having its lower end in engagement with the teeth of a ratchet wheel 31 and held against the wheels by a weight 32. The wheel 31 is mounted on the input shaft 33 of a gear box 34 having an output shaft 35 connected to a counting mechanism 36 and, with the arrangement described, the eccentric 26 is rotated at a rate corresponding to the velocity of the travel of material through the channel 11.

Air from the main supply line 15 flows through a branch 37 containing a valve 38 and a line 39 to a manifold 40. A plurality of pipes 41 project downward in a number of rows through the top of channel 12 and terminate close to the porous partition therein and within the layer of material being conveyed. The pipes in each row are spaced in the direction of travel of the material as shown in Fig. 1.

Air from branch 37 at supply line pressure travels through a line 42 containing a flexible section 43 to one inlet of a ring balance 44 at one side of a fixed partition 45 in the balance. A line 46 leading from the top of channel 12 above the layer of material leads to the inlet of the balance at the other side of the fixed partition and line 46 also has a flexible section 47. In the ring balance, the partition 45 is subject at one side to the pressure of air being supplied to manifold 40 and at the other side to the pressure of air, which has passed through the layer of material traveling through channel 12 and has undergone a pressure drop. The difference in pressure of the air before and after it has passed through the layer of material is a measure of the density of the material and hence of its weight.

The ring balance 44 comprises a hollow annular member having spokes 48 attached to a hub 49 fast on a shaft 50 freely rotatable in suitable bearings 51. The hollow member contains a body of mercury 52, which divides the interior of the member into two chambers lying between the mercury and partition 45 and containing the respective inlets. The ring balance is weighted at 53, so that it tends to maintain a position with its fixed partition 45 at the top and the movable mercury partition 52 at the bottom.

A mercury switch 54 comprising an annular tube 55 is mounted by spokes 55a on shaft 50 and the switch has a number of terminals 56 extending in a row through the upper wall of the lower part of the tube and connected together and to a lead 57. The tube is also provided with a plurality of terminals 58, which extend in a row through the lower wall of the tube below terminals 56. A drop of mercury 59 within tube 55 connects terminals 56 to various terminals 58, depending on the angular position of shaft 50. Terminals 58 are connected by lines 60 to respective electromagnets 61 mounted on an arcuate support 62 and the electromagnets are connected to a common return line 63. The lead 57 and line 63 are connected to power lines 64, 65, respectively. An armature 66 lying close to the electromagnets is carried by an arm 67 on a shaft 68 within the meter casing 25 and the shaft carries a second arm 69, which is connected by a link 70 to an arm 71 mounted to swing on fixed pivot 29 and having a stop 72 beneath and engageable by arm 28.

In the operation of the apparatus, air at main line pressure enters one chamber of the ring balance 44 through line 42, while the other chamber is in communication through line 46 with the interior of channel 12 at a place where the air from the main line has undergone a pressure drop by reason of its passage through the layer of material traveling through the channel. As a result of the unbalanced pressures acting on opposite sides of the partition 45, the ring balance tends to move angularly through an arc varying with the difference between the pressures and this movement of the ring balance, and shaft 50 causes a corresponding angular movement of the mercury switch 54. The drop of mercury 59 in the switch is of such size that it will always connect at least one terminal 56 with two and no more than three adjacent terminals 58, so that at least two and no more than three adjacent electromagnets 61 are energized. The armature 66 is of sufficient size to span three electromagnets and it travels on an arc concentric with the support 62 carrying the electromagnets. When a pair of adjacent electromagnets are energized, a magnetic circuit is set up through the core of one electromagnet, the armature, and the core of the other with the result that the armature tends to center itself relative to the three electromagnets. If three electromagnets are energized, the same action takes place, except that there are two magnetic circuits through the armature instead of one. The position of the armature at any particular time thus depends on the electromagnets, which are energized, and the energization of the electromagnets depends on the angular position of the ring balance, which in turn depends on the difference in pressure of the air before and after it has passed through the layer of material in channel 12. As the armature 66 is moved, it adjusts the position of arm 71 and thus determines the amplitude of the operating stroke of pawl 30 acting on ratchet wheel 31.

In the apparatus, the meter registers the product of the weight of the material traveling through channel 12 and the velocity of the material. However, the weight is not determined directly, but indirectly as a function of the density of the material. The air, which is supplied to the layer of material through pipes 41, acts to maintain the fluidity of the material and is the only air employed for the purpose. However, in some installations, it may not be necessary to shut off that part of the porous partition within chamber 12 supporting the layer of material, through which air is to be passed in determining the density of the material. Under such conditions, the manifold 40 and pipes 41 may be dispensed with and air may be admitted beneath the porous partition within channel 12 in any convenient manner.

I claim:

In a system for conveying finely divided material, the combination of a pneumatic channel, means for supplying material to the channel at one end for discharge at the other, an endless series of vanes entering the material travelling through the channel, a movable support for the vanes, the vanes being moved by the material and moving the support at a rate corresponding to the instantaneous velocity of the material, means for passing air under pressure transversely through the layer of material traveling through the channel, a movable member, means moving the member in response to variations in the difference in pressure of the air before and after it has passed through the layer of material, the instantaneous deflection of the member from an initial position corresponding to the instantaneous value of the pressure drop of the air resulting from its passage through the material, an integrating meter for giving an indication proportional to the product of the instantaneous value of the velocity of the support and the instantaneous value of the deflection of the member, a connection between the support and the meter, and a connection between the member and the meter.

References Cited in the file of this patent

UNITED STATES PATENTS

| Number | Name | Date |
|---|---|---|
| 719,446 | Dyer | Feb. 3, 1903 |
| 1,025,227 | Wylie | May 7, 1912 |
| 2,183,374 | Walker | Dec. 12, 1939 |
| 2,206,512 | Reinholz et al. | July 2, 1940 |
| 2,331,208 | Ludi | Oct. 5, 1943 |
| 2,339,289 | Olken | Jan. 18, 1944 |
| 2,671,657 | Cooper | Mar. 9, 1954 |
| 2,728,218 | Ramser | Dec. 27, 1955 |
| 2,905,538 | McIntire | Sept. 22, 1959 |